US006876927B1

(12) United States Patent  (10) Patent No.: US 6,876,927 B1
Chatelain et al.  (45) Date of Patent: Apr. 5, 2005

(54) DIGITAL DATA RECORDER EXEMPT OF A SITE BACKGROUND NOISE

(75) Inventors: Jean-Luc Chatelain, Grenoble (FR); Philippe Gueguen, Meylan (FR); Bertrand Guillier, Dorceau (FR); Francis Bondoux, Quito (EC)

(73) Assignee: Institut de Recherche pour le Developpement, Paris Cedex (FR)

( * ) Notice: Subject to any disclaimer, the term of this patent is extended or adjusted under 35 U.S.C. 154(b) by 206 days.

(21) Appl. No.: 10/148,076

(22) PCT Filed: Nov. 24, 2000

(86) PCT No.: PCT/FR00/03295

§ 371 (c)(1), (2), (4) Date: Oct. 8, 2002

(87) PCT Pub. No.: WO01/38901

PCT Pub. Date: May 31, 2001

(30) Foreign Application Priority Data

Nov. 26, 1999 (FR) .............................. 99 14943

(51) Int. Cl.[7] .............................................. G06F 19/00
(52) U.S. Cl. ............................................. 702/1; 367/15
(58) Field of Search ............................... 702/17, 1, 15, 702/18; 367/15, 21, 78, 50, 56, 36; 341/143

(56) References Cited

U.S. PATENT DOCUMENTS

| | | | | | |
|---|---|---|---|---|---|
| 1,240,328 | A | * | 9/1917 | Fessended | 367/36 |
| 3,597,727 | A | * | 8/1971 | Judson et al. | 367/50 |
| 3,731,270 | A | * | 5/1973 | Penhollow | 367/56 |
| 3,731,526 | A | | 5/1973 | Games | 73/660 |
| 3,916,371 | A | * | 10/1975 | Broding | 367/78 |
| 4,210,968 | A | * | 7/1980 | Lindseth | 367/46 |
| 4,323,990 | A | * | 4/1982 | Goode et al. | 367/21 |
| 4,516,206 | A | * | 5/1985 | McEvilly | 702/18 |
| 4,604,699 | A | * | 8/1986 | Borcherdt et al. | 702/15 |
| 4,612,620 | A | | 9/1986 | Davis et al. | 702/184 |
| 4,628,493 | A | * | 12/1986 | Nelson et al. | 367/79 |
| 4,935,905 | A | * | 6/1990 | Gassaway | 367/59 |
| 4,980,844 | A | | 12/1990 | Demjanenko et al. | 702/56 |
| 5,111,399 | A | * | 5/1992 | Armitage | 702/17 |
| 5,189,642 | A | * | 2/1993 | Donoho et al. | 367/15 |
| 5,600,318 | A | * | 2/1997 | Li | 341/143 |
| 5,633,811 | A | | 5/1997 | Canada et al. | 702/56 |
| 5,774,417 | A | | 6/1998 | Corrigan et al. | 367/24 |

FOREIGN PATENT DOCUMENTS

| | | | |
|---|---|---|---|
| EP | 0 010 660 | 5/1980 | G08G/1/056 |
| EP | 0 717 387 | 6/1996 | G08G/1/056 |
| GB | 2 336 675 | 10/1999 | G01H/1/00 |
| WO | 93/10448 | 5/1993 | G01H/1/00 |

* cited by examiner

Primary Examiner—John Barlow
Assistant Examiner—Victor J. Taylor
(74) Attorney, Agent, or Firm—Young & Thompson

(57) ABSTRACT

A standalone digital data recorder of site background noise, by seismological transducer, providing at least data H and V in the form of analog signals, includes an acquisition and analog/digital conversion card, which includes at least two analog channels and a digital output, each analog channel including an input, a programmable gain analog signal amplifier and a filter, an analog multiplexer being provided between the filters and an analog/digital converter; a user interface; a removable storage device for storing data, a drive unit for an operating program, which includes a unit for enabling recording conditions, recording and warning of the end of the recording.

11 Claims, 2 Drawing Sheets

DIGITAL DATA RECORDER EXEMPT OF A SITE BACKGROUND NOISE

BACKGROUND OF THE INVENTION

This invention relates to a standalone digital data recorder of site background noise. It finds applications in seismology and, in particular, when micro zoning a site, i.e., when studying the behaviors of the soil and/or constructions on a site in relation to the vibrations to which they are exposed.

DESCRIPTION OF THE RELATED ART

Studying the behavior of a site, a soil or a construction, exposed to small amplitude vibrations is useful in order to be able to assess the behavior of the soil or of the constructing during various mechanical stresses.

Techniques wherein the vibrations are produced artificially by mobile generating vehicles that can apply repeated loads to the soil or on elements of a building in order to stress them are known. Seismometric transducers are placed in various points on the site and along particular axes. The signals generated by these transducers are measured and analyzed in a data processing unit. This kind of method enables for instance to deduce the structure of the terrains, to detect the resonance frequency of a construction along a given axis, etc.

It has proven possible to do away with specific vibration generators and to use the natural seismic vibration source represented by micro earthquakes in the zones where the latter are frequent. However such a technique, besides the fact that it seems a random one because it involves waiting for such an earthquake, cannot be used in "calm" zones from a seismologic viewpoint.

Micro zoning of a site involves collecting and recording the signals from the transducers in various points of the site simultaneously during several minutes then to analyze them in order to draw conclusions. Thus, in cases when micro earthquake excitation is used, there must be several recorders and corresponding transducers for more or less a random period.

A more recent technique has been developed wherein the excitation is produced by the original natural or artificial background noise of the site. These natural sources are for instance, thunder, waves, etc. The artificial sources result from human activities and, for instance, road traffic, etc.

In case when background noise is used to excite the site, the load on the simultaneity of the data collected and recorded seems less significant. It is thus possible to collect and record data at various points and distinct moments, then to use them at a later date for analysis. It is thus possible with a single device to perform rapid micro zoning of a site.

Later processing of the signals generated by the transducers takes into account the particularity of the excitation by the background noise in order to produce exploitable results. It is thus, for instance, possible to determine the natural frequency of a site thanks to this background noise micro zoning technique.

Conventional devices for recording the signals from seismometric transducers as mentioned in U.S. Pat. No. 4,604, 699 are not particularly suited to these micro zoning techniques and do not enable to benefit from all the advantages of the techniques. More especially, they involve complex adjustment of numerous parameters, disconnection of the transducers and/or of the seismometer, of the recorder after each recording session. As the recording sessions normally take place over along periods, the data collected is compressed. These are also reinforced devices intended to resist potentially aggressive environments over long periods. They are not designed either for frequent displacements. A station designed for recording earthquakes is therefore not suited and causes a significant waste of time during a micro zoning campaign. Moreover, the conventional stations designed for recording earthquakes, due to their complexity, involve supervision by specialized teams, which also limits the possibility of conducting numerous measurements on the different points of a micro zoned site. Finally, these stations intended to record earthquakes that generate high amplitude signals are not suited to amplify and record the background noise.

SUMMARY OF THE INVENTION

It is therefore advisable to have a specific hardware suited to micro zoning campaigns. To this end, the invention relates to a standalone digital data recorder of a site background noise, the recorder receiving the data from seismological transducers, the transducers supplying at least a first type of data H and a second type of data V in the form of analog signals, the recorder comprising:

an acquisition and analog/digital conversion card according to an acquisition rate, the card comprising at least two analog channels and a digital output, each analog channel comprising an input, a gain programmable analog signals amplifier and a filter, the filter comprising at least a low-pass function, an analog multiplexer being provided between the filters and an analog/digital converter, each transducer being connected to a specific channel;

a user interface enabling visualizing, listening to and inputting information.

According to the invention, the recorder comprises moreover a remarkable storage device for storing the data and a drive unit comprising an operating program, the program comprising a means enabling to set up the recording conditions, the recording and the warning at the end of the recording session, to set up the operating conditions by means of the user interface enabling at least to select the gain, the acquisition rate and the duration of the recording sessions.

In various embodiments of the invention, the following means that can be used solely or according to all their technically possible combinations, are implemented:

the storage device is a flash memory module;

the storage device is a hard disk;

the storage device is a floppy;

the card comprises moreover on each channel, between the input and the amplifier, a pass-band filter;

the card comprises moreover on each input an array matching the impedance of the corresponding transducer;

the matching array is removable for manual matching for each new transducer;

the means enabling to set up the recording conditions allows moreover to select a number of recording cycles greater than or equal to one and a pause value greater than or equal to zero, said pause value corresponding to a pause time interval between two recordings;

the means enabling to set up the recording conditions comprises moreover a setup test in order to detect and inform a user that the selected parameters lead to saturation of the storage device;

the drive unit is a PC compatible data processing module with at least one PCMCIA type interface for a PCMCIA type flash memory module;

the recorder comprises three analog channels;

the gain is programmable;

the gain is programmable by 6 dB steps between 0 dB and 102 dB;

the recorder comprises a means informing the user that the acquisition and conversion card is saturated;

the acquisition rate is programmable;

the acquisition rate is programmable between 50 Hz and 250 Hz;

the resolution of the analog/digital converter is programmable;

the resolution of the analog/digital converter ranges between 8 and 32 bits;

the resolution of the analog/digital converter is 24 bits;

the user interface comprises for entering information, 3 pushbuttons, the same button fulfilling different functions in relation to a visualized context;

the user interface comprises for visualization an alphanumerical display unit;

the user interface comprises for visualization an alphanumerical liquid crystal display unit;

the user interface comprises for visualization, in case when preheating is provided after switching the recorder on, a preheating light-emitting diode actuated for a preset thermal stabilization time;

the user interface comprises for visualization a saturation light-emitting diode actuated when a signal saturates the acquisition and conversion card;

the user interface comprises for visualization, in case when a means for short-circuiting the transducers is arranged in the acquisition and conversion card, a transducer short-circuiting light-emitting diode actuated when the signal comes from the transducers;

the user interface comprises for visualization a light-emitting diode actuated when the recording takes place;

the recorder comprises as a user interface either an alphanumerical display unit, or at least one light-emitting diode;

the user interface comprises for listening, a sound generator, the generator being at least actuated upon completion of a recording session or a recording cycle;

in case when preheating is provided, the recorder comprises means so that recording can only take place after the preset thermal stabilization time, acquisitions without recording being however possible before the end of the preset time in order to determine during this period the operating parameters.

The recording according to the invention can be used by a non-specialized personnel, the unit being cheaper and easier to handle. Analysis of the data takes place on an external data processing unit, the data being transmitted, stored, in a storage device that, in a preferred embodiment, is a PCMCIA flash memory module.

BRIEF DESCRIPTION OF THE DRAWINGS

This invention will be understood better when reading a non-limiting following example of realization of the invention where.

DESCRIPTION OF THE PREFERRED EMBODIMENT

Figure 1:
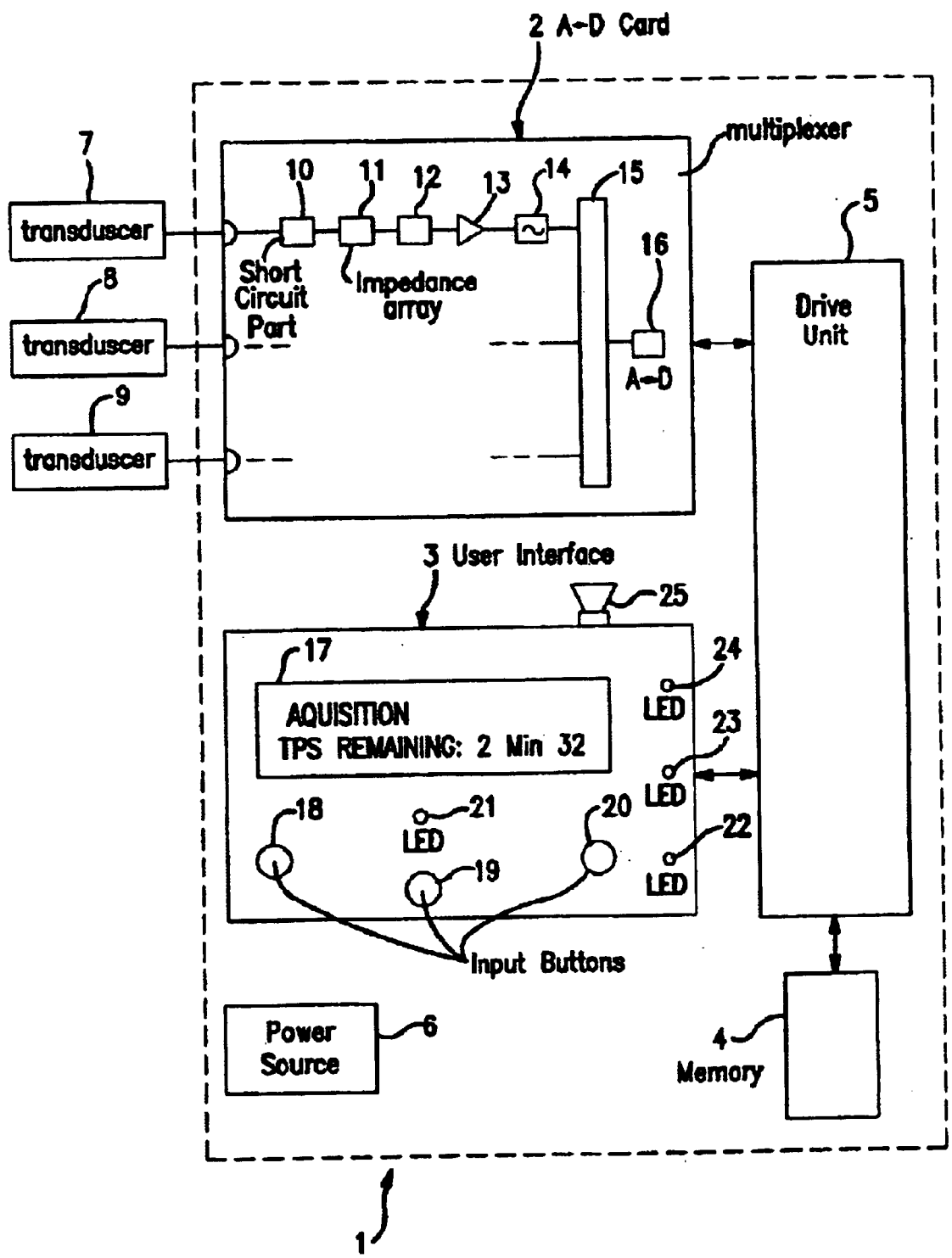
FIG. 1 represents schematically a recorder.

On FIG. 1, the recorder 1 comprises an acquisition and analog/digital conversion card 2, a user interface 3, a removable flash memory module 4, a drive unit 5 and a standalone power supply source 6. The standalone power supply source 6 may be a single use battery or a rechargeable battery. It powers the various elements of the recorder 1.

In this embodiment, the recorder 1 is connected to three seismological transducers 7, 8, 9. The linking devices between the recorder and the transducers are multipin connectors enabling connection to either passive or active transducers. As regards the latter, supply pins are provided on the connectors.

The signals from the transducers are received by the card 2 and processed on three corresponding analog channels.

Each analog channel comprises a device 10 intended to enable to short-circuit the corresponding input, an impedance matching array 11 enabling maximizing the transfer of the signal between the transducer and the recorder. In an enhanced embodiment of the invention, the impedance adapter 11 will be a removable module or comprising removable components enabling optimal impedance adaptation for every new transducer, the module or the component(s) being changed. It is also contemplated that some pins of the connectors are connected to specific impedance matching arrays enabling automatic matching in relation to the transducer, active or passive for instance, by a simple connection using specific terminal connectors for a given transducer.

In another embodiment of the invention the short-circuiting device is omitted. It is more especially the case if one wishes to use active transducers that do not allow for their output to be short-circuited. There, also certain pins of the connectors can be connected to a short-circuiting means whereas others will not, enabling thus to use indifferently passive transducers that can be short-circuited and active transducers not liable to be short-circuited. Between both types of transducers, the connections at their terminal connectors will therefore be different.

Each channel comprises also a programmable gain amplifier 13 as well as a low pass filter 14. The filter 14 is intended to avoid the spectral folding phenomenon in case when the analog input signal comprises frequency components greater than or equal to half the sampling rate of the analog/digital converter 16 provided at the output of the card 2. Between each of the filters 14 and the analog/digital converter 16 is provided a multiplexer 15 enabling to select the analog channel to be converted.

The interface 3 comprises a liquid crystal alphanumerical display unit 17, pushbuttons 18, 19 and 20 intended to enable to input information, light-emitting diodes 21, 22, 23 and 24 intended for displaying particular information and a sound generator 25. Inputting information by means of the interface 3 is possible thanks to the interaction of the display unit 17 and/or of the light-emitting diodes with the buttons 18, 19 and 20. The function of each of the buttons depends on information displayed on the display unit 17 and/or by the light-emitting diodes. In a less evolved embodiment of the invention, the recorder will comprise as visualization interface only light-emitting diodes at least one in number and in another embodiment an alphanumerical display unit.

The interface enables for instance to select the gain, the durations, recording repetitions, setting a clock, acquisition rate, stopping the current acquisition, let alone other operating parameters. It is thus possible to input a threshold of saturated samples which will cause a sound warning in case of overshoot.

The unit 5 is preferably a PC compatible data processing module comprising an interface PCMCIA that can accept a flash memory module 4. The unit 5 comprises a saved clocked that can be reset and updated by means of the interface 3. Time information can be used when data in the flash module are recorded.

In the embodiment, the analog/digital converter 16 is a 24 bit converter and has an acquisition rate programmable between 50 and 250 Hz. Within the scope of the invention it is contemplated to use a converter with smaller or greater resolution as well as other sampling rates.

Each of the amplifiers 13 is programmable, whereas the gain can be selected between 0 and 102 decibels, either automatically by a means provided in the program of the drive unit, or manually by means of the interface 3. Within the scope of the invention, other gain values are contemplated. Automatic selection of the gain is made by acquisitions without recording and by gradual, linear or jump modification, of the gain up to saturation, the gain selected being then chosen smaller than the gain having caused saturation. In another automatic embodiment, the gain selected is calculated from single gain acquisitions which have not caused any saturations.

The program of the unit 5 comprises also the means enabling to preheat the recorder, the recording being impossible during the preheating period. It is however considered that during the preheating time it is possible to select the gain of the amplifiers 16 of the analog channels in order to determine more quickly which gain can be used without any excessive saturations. It is also contemplated within the scope of the invention that the recorder is operational as soon as it is switched on, i.e. the preheating stage for thermal stabilization of the circuits is omitted. This can be obtained by using small thermal drift components and/or by software correction and/or while considering the drift as negligible. It is also contemplated that the acquisition and conversion card comprises a self-calibration means, a reference voltage source that can be injected into the analog circuits during a calibration phase.

The recorder realized comprises an approx. 12 V battery power supply with possible external recharges, 3 analog channels with differential inputs, a 24 bit analog/digital converter Delta Sigma. The maximum resolution may however vary in relation to the acquisition rate. The dynamics of the recorder is 108 dB at the acquisition rate of 100 Hz and 90 dB at 250 Hz. The acquisition rate is programmable and may, for instance, be selected according to five values: 50, 100, 125, 200, 250. In another embodiment, the acquisition rate may be chosen as a multiple of the frequency of the alternate electric power supply network of the site in order to increase the rejection of possible array noises.

The operation program enables to select the duration of the recordings between 1 minute and 60 minutes. At the end of the recording session, a sound signal is emitted by the user interface in order to enable the audition and to inform the user of the end of the recording session. In the cyclic operating mode, the pause duration between two recordings may be selected between 1 hour and 12 hours. During the recording, the operating program may display the remaining time, the input level and/or the saturation and/or the number of points corresponding to saturation in numerical and/or absolute graphic form on in percnetage. The operating program comprises also means for detecting the level of the electric power supply in order to inform the user of any decrease in level then, if the lever does not pick up and/or decreases still further, to put the recorder in small power consumption standby mode, possibly to shut it down completely.

The user interface comprises 3 pushbuttons 18, 19, 20 enabling to enter all the information necessary to the operation of the recorder. The function of each of the buttons depends on a context displayed. For instance the button used for starting an acquisition or a cycle also serves to stop it, when required, if depressed and held.

In the case of use for micro zoning, the raw data acquired is stored. It is not necessary to compress the data as in the case of conventional seismological stations for which the recordings must be carried out over longer periods. It is thus possible to store on an approx. 20 MB flash memory card approximately 6 hours of data at 100 Hz. The operation program may also comprise the means enabling to display the use rates of the flash memory. The raw data is stored in the flash card in a PC compatible format file, and preferably ASCII format.

Figure 2:
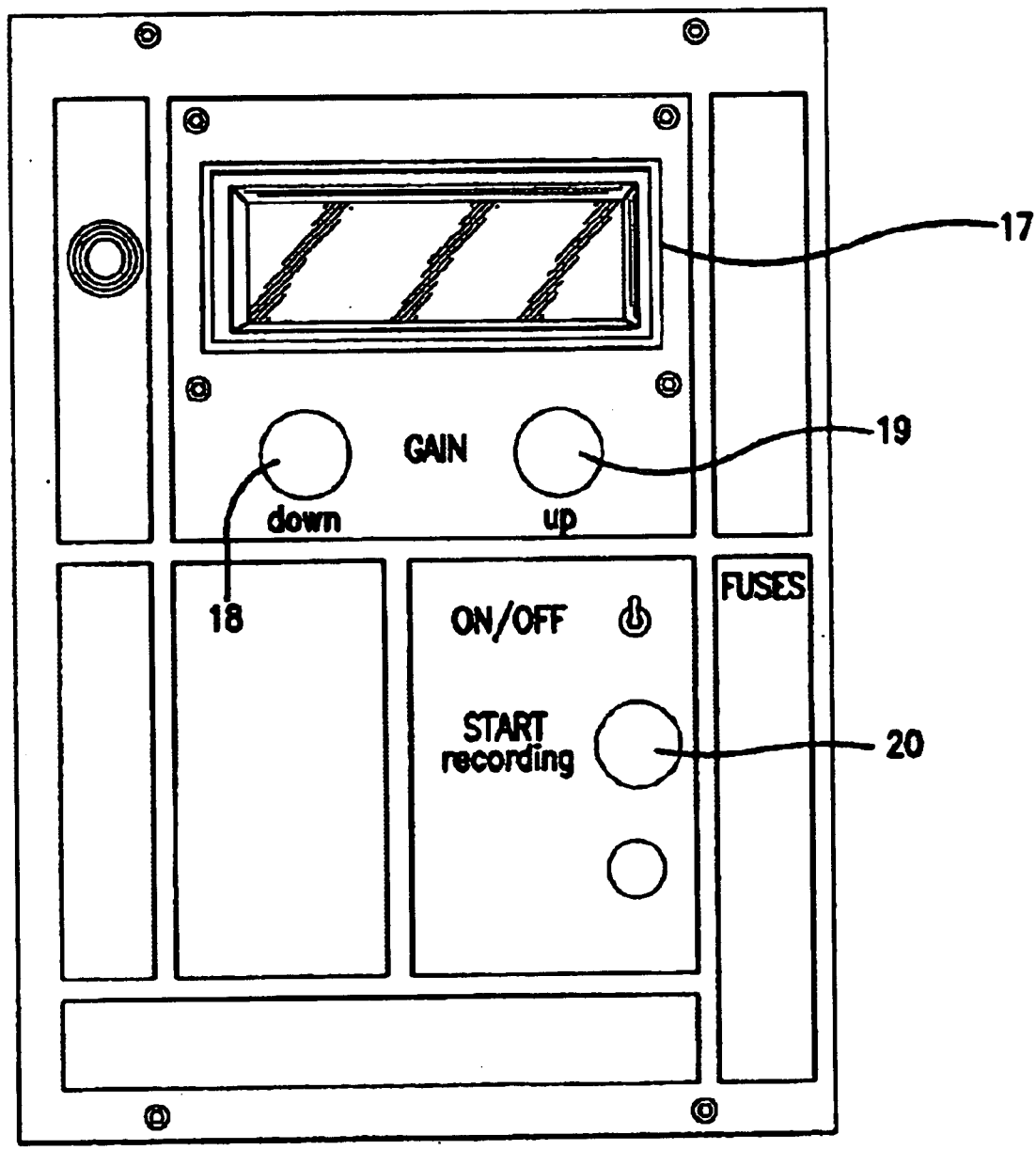
FIG. 2 represents the front face of the recorder.

On FIG. 2, the front face of the recorder has been represented. It comprises pushbuttons ("start recording", "down", "up"), an "on/off" switch, the liquid crystal display unit as well as some commercial information (trademarks and/or trade names and/or Company names) or practical information. As regards the latter, a spare set of fuses is available ("spare fuses", "Fuses"), 2 Amperes for the external power supply ("external power 2 Amp.") and 4 Amperes for charging the battery ("battery charge 4 Amp.").

The display unit also provides the following information: the gain selected ("gain"), the percentage of saturating acquisition points ("Acq Pts"), the name of the following file ("nextFil"), the duration and repetition ("Long", "Rep") and in the form of bar graph or "barograph" the maximum amplitude of the points acquired ("Amp Max").

The display unit may also display other types of information and, for instance the acquisition rate, the name of the current file, the remaining time . . . . The default name of the storage file is in the form mmddhhmm.nnn with mm the month, dd the day, hh the hours, mm the minutes and nnn a numerical index ranging between 1 and 999.

The background noise recorder of a site is therefore a device simple to handle, which does not involve any keyboards for inputting data, since three pushbuttons are sufficient. It enables immediate processing of the data stored on the flash memory module 4 by exchange with a second card in the recorder. The recorder does not need to implement the pre- and/or post-event memories.

What is claimed is:

1. Standalone digital data recorder (1) of a site background noise, said recorder receiving data from seismological transducers (7, 8, 9), said transducers providing at least a first type of data H and a second type of data V in the form of analogue signals, said recorder comprising:

an acquisition and analogue/digital conversion card (2) according to an acquisition rate, said card comprising at least two analogue channels and a digital output, each analogue channel comprising an input, a programmable gain analogue signals amplifier (13) and a filter (14), said filter comprising at least one low-pass function, an analogue multiplexer (15) being provided between the filters (14) and an analogue/digital converter (16), each transducer being connected to a specific channel;

a user interface (3) enabling visualisation (17, 21, 22, 23, 24), and input (18, 19, 20) of information;

a removable storage device (4) for storing the data; and a drive unit (5) comprising an operating programme, said programme comprising a means enabling to set up the recording conditions, the recording and the warning of the end of the recording session, to set up the operating conditions by means of the user interface enabling at least to select the gain, the acquisition rate and the duration of the record, characterised in that the card (2) comprises moreover on each input an array (11) for matching the impedance of the corresponding transducer, said array being removable in order to enable manual matching for each new transducer.

2. A recorder according to claim 1 characterised in that it comprises linking devices between the said recorder and the transducers which are specific multipin connectors of a transducer kind for impedance adaptation.

3. A recorder according to claim 1 characterised in that he card comprises moreover on each channel, between the input and the amplifier, a pass-band filter (12).

4. A recorder according to claim 1, characterised in that the means enabling to set up the recording conditions enables moreover to select a number of recording cycles greater than or equal to one and a pause value greater than or equal to zero, said pause value corresponding to a pause time interval between two recordings.

5. A recorder according to claim 1, characterised in that the means enabling to set up the recording conditions comprises moreover a set-up test in order to detect and inform a user that the selected parameters cause saturation of the storage device.

6. A recorder according to claim 1, characterised in that the drive unit is a PC compatible data processing module with at least one PCMCIA interface for a PCMCIA flash memory module.

7. A recorder according to claim 1, characterised in that the user interface comprises:

for visualisation an alphanumerical display unit;

for listening, a sound generator, the generator being at least actuated upon completion of a recording or a recording cycle;

for inputting information, 3 pushbuttons, the same button having different functions in relation to a visualised context.

8. A recorder according to claim 1, characterized in that it comprises a means informing the user of the acquisition card saturation, said means providing a saturation acquisition point number percentage display.

9. A recorder according to claim 8, characterised in that it comprises a means providing a sound warning in case of overshoot of saturated sample threshold, said threshold being inputted by the user interface.

10. A recorder according to claim 7, characterised in that the user interface further comprises for visualisation at least one light-emitting diode.

11. Standalone digital data recorder (1) of a site background noise, said recorder receiving said data from seismological transducers (7, 8, 9), said transducers providing at least a first type of data H and a second type of data V in the form of analog signals, said recorder comprising:

an acquisition and analog/digital conversion card (2) according to an acquisition rate, said card comprising at least two analog channels and a digital output, each analog channel comprising an input, a programmable gain analog signals amplifier (13) and a filter (14), said filter comprising at least one low-pass function, an analog multiplexer (15) being provided between the filters (14) and an analog/digital converter (16), each transducer being connected to a specific channel and on each input an impedance array (11) for matching the impedance of the corresponding transducer to the impedance of the input of the programmable amplifier (13), said array being removable in order to enable manual matching for each new transducer;

a user interface (3) enabling visualization (17, 21, 22, 23, 24), and input (18, 19, 20) of information;

a removable storage device (4) for storing the data; and a drive unit (5) comprising an operating program, said program comprising a means enabling to set up the recording conditions, the recording and the warning of the end of the recording session, to set up the operating conditions by means of the user interface enabling at least to select the gain, the acquisition rate and the duration of the recording.

* * * * *